July 23, 1935.　　W. P. BRENNAN ET AL　　2,009,059
RAILWAY DEVICE
Filed May 31, 1934
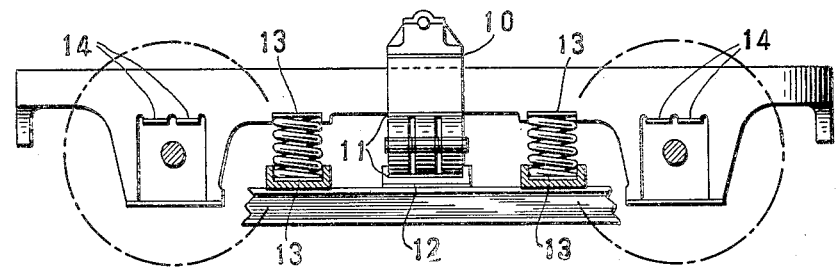
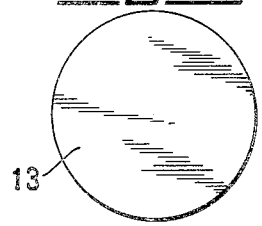
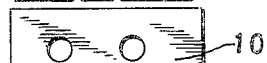
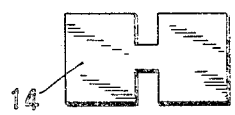
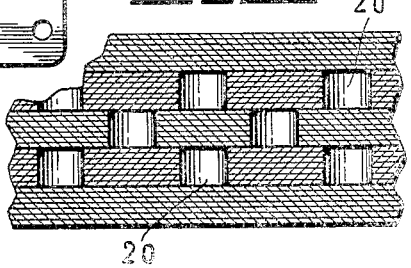
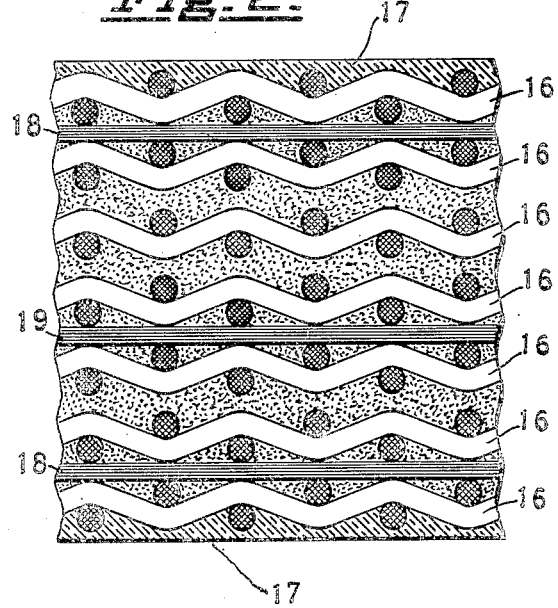
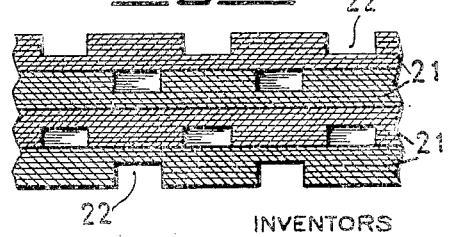
INVENTORS
WILLIAM P. BRENNAN,
THOMAS F. DWYER, JR.,
ATTORNEY Patented July 23, 1935

2,009,059

UNITED STATES PATENT OFFICE 2,009,059

RAILWAY DEVICE

William Patrick Brennan, Newton, and Thomas Francis Dwyer, Jr., Cambridge, Mass., assignors to Fabreeka Products Company, Inc., Boston, Mass., a corporation of Massachusetts Application May 31, 1934, Serial No. 728,246

8 Claims. (Cl. 267—63)

This invention relates to shock-absorbing, vibration-eliminating and sound-deadening pads such as are used in a variety of places especially in railway rolling stock etc. and has for its main object to provide a pad which will reduce the tendency to transmit harmonic or resonant vibrations while at the same time possessing just enough resiliency and a maximum flexibility to return to original form after compressive stresses.

One object is to provide a pad which is very durable and unaffected by water, oil or ice, or temperature changes.

Another object is to provide a pad which can be used with existing railway equipment, that is, without substantial alterations in the car parts.

Heretofore sound-deadening, vibration-eliminating and shock absorbing pads have been of two general classes. One such class comprises fabrics alone without any rubber-like resilient material and these soon become dead and lifeless through compression. The other class involves rubber pads or pads of rubber with fabric or metal attached. This last type is open to the objection of possessing too great a resiliency in all directions so that all vibrations seem to be too readily transmitted and are uncontrolled. They also become self vulcanized and/or deformed. Soft rubber also flows under continued pressure and loses its shape and becomes useless.

Pads formed merely of rubber are objectionable because they take up too much room and permit seriously objectionable vibrations.

We have found that pads made up of a large number of layers or plies of very thin tough cotton duck or canvas cemented together and preferably furnished with a number of thin layers of soft rubber compound provide flexibility and just sufficient resiliency to prevent transmission of sound vibrations but without permitting sufficient action to start amplification of sympathetic vibrations. Side play is also avoided.

The present invention substantially eliminates lateral vibrations by the use of a number of very thin layers of soft rubber about eight thousandths of an inch thick. These are too thin to have any substantial lateral yield, yet have been found thick enough to keep the layers of fabric from becoming dead. These composite pads are cut or stamped to the desired size and shape to fit the required positions. They have sufficient body to hold their shape without special holders.

These pads have proven to very durable even under extreme conditions of various uses at all seasons of the year.

Referring to the drawing

Fig. 1 illustrates some of the applications of pads of this invention as applied to a railway vehicle truck of one form.

Fig. 2 is a conventional representation of a fragment of pad according to this invention comprising seven layers of fabric and magnified about thirty diameters.

Fig. 3 is a section through a compound type of cellular pad made up of a number of layers which have perforations in staggered relationship.

Fig. 4 is a sectional view of another modification of compound pad with grooves or channels.

Figs. 5 to 9 show different shapes of pads for use in railway rolling stock.

In Fig. 1 the railway truck illustrated is provided with a side bearing pad 10, bolster spring pads 11, spring plank pads 12, equalizer spring pads 13, equalizer pads 14 and other pads, all embodying this invention.

In Fig. 6 is shown a center plate pad 15. Fig. 5 shows a bearing pad 10 provided with perforations. Fig. 7 shows an equalizer pad 14. Fig. 8 shows an equalizer spring pad 13 and Fig. 9 shows a rail pad. These figures merely illustrate how the shock absorbing and vibration deadening pads of this invention may be made in different shapes.

The pad illustrated in Fig. 2 is in actual size only about one-eighth of an inch thick instead of being the size illustrated.

There are in Fig. 2 seven layers of fabric 16 each layer comprising cotton duck or fabric having a suitable weave and weighing about eight ounces per square yard, and having a count of 50 by 40, and a gauge of .023. The outer fabric layers are preferably coated or impregnated with some appropriate oil, water and frost-proof material 17, such for example as a synthetic cellulose base solution, or an appropriate flexible resinous material, as are preferably also the edges of the pad in order to preserve the life of the pad. There is a layer 18 of thin rubber compound located just inside of each outer fabric layer and also an inner rubber layer 19. Due to there being an uneven number of plies of fabric the inner layer is not located exactly in the center of the pad.

These layers of duck are suitably cemented together by an adhesive or rubber cement which remains tacky and effective for an indefinitely long time.

While Fig. 2 shows seven fabric plies and three thin layers of rubber or other suitable resilient material, it will be understood that this invention is not limited to this number of plies nor to this number of layers.

The pads of this invention are thin, of low cost, and adapted to be readily installed in existing installations without modification in design. When used in railway vehicles in numerous places such as are suggested by Fig. 1 and elsewhere, there results a greater reduction and elimination of vibrations and an improved riding quality as well as a substantial reduction in the amount of noise and noticeable rumble of the car. The very thin layers of rubber are just enough to keep the pad flexible. Preferably these layers should not be over one fiftieth of an inch thick.

The woven textile fabric is impregnated with a suitable cement and the thin layers of rubber are laid in place and vulcanized to produce the finished material from which the pads are cut. The cement with which the fabric is impregnated seals the edges of the pad.

In practice it has been found that these pads do not deteriorate in the air nor are they substantially effected by frost, cold, heat or oil.

The rubber compound used in our pads is of such a character and is so protected that it does not harden under ordinary conditions.

Our new pads have also been used with great success in railway track construction interposed beneath the rails and between the ties and plates. Frost and rain seem to have no effect whatever upon them and they retain their working condition for long periods without requiring repair or replacement.

These pads are quite flexible and yet are sufficiently rigid to hold their shape. They are so thin that they may be inserted in various positions without requiring special holders or pockets, which are very expensive. In some cases, however, special holders may be employed. Similar pads may also be used in metallic frame-work construction to prevent transmission of vibrations from one member to another.

These special pads may be used with highly desirable results in the construction of platform and vestibule parts as well as in car body points where noise insulation is required. They are also useful in draft and buffing mechanism to prevent transmission of vibrations.

In Fig. 3 is shown a compound pad made up of layers each of the size and type similar to that shown in Fig. 2 except that some of the layers are provided with perforations 20 and these perforations in the different layers are arranged in staggered relationship in order to permit greater compressibility of the pad. The perforations in Fig. 3 may be in each layer including the outer or covering layer, but preferably the outer layer is not perforated.

Fig. 4 shows a compound pad formed of units 21 similar to those above described but secured together and having grooves or channels 22 cut or formed to provide greater adaptability and prevent side slip.

We claim:

1. A shock absorbing pad comprising a plurality of fabric layers cemented together and having at least one very thin layer of rubber compound interposed between two layers of fabric, said interposed layer being so thin as to substantially eliminate any resiliency of the material normal to its layer thickness under variable compressive stresses applied in the direction of the depth or thickness of the layers, thus reducing lateral vibrations and said layer being only thick enough to lessen any tendency for the fabric to become compressed and lifeless.

2. A flexible shock absorbing pad for vehicles comprising a plurality of woven fabric layers cemented together and having at least one very thin layer of soft rubber between two of said fabric layers, said rubber layer being so thin as to substantially eliminate any resiliency of the material normal to its thickness thus substantially preventing lateral vibrations, some of the fabric layers being without any interposed layer of rubber and in direct contact.

3. A shock absorbing pad comprising a number of layers of woven textile fabric cemented together and provided inside with at least two very thin layers of resilient material, each interposed between layers of fabric, each interposed layer being no more than about one fiftieth of an inch in thickness and some of the fabric layers being directly cemented together.

4. A shock absorbing pad comprising a number of layers of fabric cemented together and provided inside with at least two very thin layers of rubber each between layers of fabric, said rubber layers being about eight thousandths of an inch in thickness and at least several of the fabric layers having no rubber layers therebetween.

5. A flexible shock absorbing pad comprising a number of layers of fabric cemented together and provided inside with a very thin layer of soft rubber adjacent each surface of the pad and a third layer near the center, some of the fabric layers each side of the center being without any interposed layer of rubber and in direct contact, and the rubber layers being thick enough to prevent the fabric layers becoming compressed and lifeless and yet thin enough to substantially eliminate any resiliency of the pad normal to its thickness whereby the transmission of lateral vibrations and noises is substantially reduced.

6. A shock absorbing pad comprising a number of layers of cotton fabric cemented together and provided inside with at least two very thin layers of resilient material, each between layers of fabric, each resilient layer being no more than about one fiftieth of an inch in thickness, the edges of said pad being sealed with a material to prevent decomposition of the resilient material and coated with an oil-proof material.

7. A shock absorbing pad comprising a number of layers of cotton duck cemented together and provided inside with at least two very thin layers of rubber-like material, each between layers of fabric, each rubber-like layer being no more than about one fiftieth of an inch in thickness and most of the fabric layers having no rubber therebetween and another very thin layer of rubber-like material located centrally of the pad and of about the same thickness as the aforementioned layers of rubber.

8. A shock absorbing pad comprising a plurality of fabric layers some of which are cemented together and having at least one thin layer of rubber compound interposed between two layers of fabric, said interposed layer being sufficiently thick to prevent the pad becoming compressed and lifeless and sufficiently thin so as to prevent undue resiliency of the pad laterally of the layer thicknesses under variable compressive stresses applied in the direction of the depth or thickness of the layers and being so positioned in the pad as not to transmit abnormal resonance in any direction upon such pressure being brought to bear on the pad.

WILLIAM PATRICK BRENNAN.
THOMAS FRANCIS DWYER, Jr.